United States Patent
Niessen et al.

(10) Patent No.: US 10,099,631 B2
(45) Date of Patent: Oct. 16, 2018

(54) COMPONENT GROUP FOR JOINING TOGETHER VEHICLE PARTS

(71) Applicant: FORD GLOBAL TECHNOLOGIES, LLC, Dearborn, MI (US)

(72) Inventors: Hubert Niessen, Heimach (DE); Frank Schwarz, Cologne NRW (DE); Michael Albrecht, Bonn NRW (DE); Achim Schmidt-Soltau, Dormagen (DE); Gregor Edelhoff, Lohmar (DE)

(73) Assignee: Ford Global Technologies, LLC, Dearborn, MI (US)

( * ) Notice: Subject to any disclaimer, the term of this patent is extended or adjusted under 35 U.S.C. 154(b) by 563 days.

(21) Appl. No.: 14/705,117

(22) Filed: May 6, 2015

(65) Prior Publication Data

US 2015/0336518 A1  Nov. 26, 2015

(30) Foreign Application Priority Data

May 22, 2014 (DE) .......................... 10 2014 209 759

(51) Int. Cl.
*B62D 65/02* (2006.01)
*B60R 13/00* (2006.01)
(Continued)

(52) U.S. Cl.
CPC ............ *B60R 13/005* (2013.01); *B60R 13/04* (2013.01); *B62D 27/06* (2013.01); *F16B 5/0225* (2013.01); *Y10T 403/16* (2015.01)

(58) Field of Classification Search
CPC ...... B62D 27/00; B62D 27/065; B62D 65/00; B62D 65/02; B62D 65/16;
(Continued)

(56) References Cited

U.S. PATENT DOCUMENTS 4,698,882 A * 10/1987 Lang ....................... F16B 5/126
24/289
6,918,712 B2 * 7/2005 Boyce .................. B62D 27/065
403/280

(Continued)

FOREIGN PATENT DOCUMENTS

DE         3304569 C1      7/1984
DE     20200900699 U1      9/2010
(Continued)

OTHER PUBLICATIONS

English machine translation for DE102010050515.
(Continued)

*Primary Examiner* — Michael P Ferguson
(74) *Attorney, Agent, or Firm* — Jason Rogers; King & Schickli, PLLC

(57) ABSTRACT

A component group is provided for joining together vehicle parts which have to be aligned, adjusted and fastened relative to one another during assembly. The component group includes at least two components which are fastened to the vehicle parts to be connected together and which are able to be displaced relative to one another and which are able to be fixed to one another after adjustment. A simple, rapid and reliable alignment of vehicle parts relative to one another is permitted.

9 Claims, 3 Drawing Sheets

(51) Int. Cl.
*B60R 13/04* (2006.01)
*B62D 27/06* (2006.01)
*F16B 5/02* (2006.01)

(58) Field of Classification Search
CPC ..... Y10T 403/32426; Y10T 403/32434; Y10T 403/32451; Y10T 403/32459
See application file for complete search history.

(56) References Cited

U.S. PATENT DOCUMENTS 7,753,423 B2 * 7/2010 Zellner, Jr. .......... B60R 13/0206
248/27.3
8,118,529 B2 * 2/2012 Crane ................. B62D 25/163
411/546

FOREIGN PATENT DOCUMENTS

DE 102011011815 A1 11/2011
DE 102010050515 A1 10/2012
DE 10 2012 021 101 * 4/2013 ................ F16B 5/02

OTHER PUBLICATIONS

English machine translation for DE20200900699U1.
English machine translation for DE3304569C1.
English machine translation for DE102011011815A1.

* cited by examiner

COMPONENT GROUP FOR JOINING TOGETHER VEHICLE PARTS

TECHNICAL FIELD

The invention relates to a component group for joining together vehicle parts, in particular vehicle trim parts, such as for example the engine hood, fender, radiator grille, etc. which have to be aligned, adjusted and fastened relative to one another during assembly, wherein the component group consists of at least two components which are fastened to the vehicle parts to be connected together and which are able to be displaced relative to one another and which are able to be fixed to one another after adjustment.

BACKGROUND

Various methods are already known as to how production and mounting tolerances may be compensated when mounting vehicle trim parts. In a known method of the aforementioned type (DE 10 2010 050 515 A1), a plurality of fastening points are provided with through-holes for receiving aligning or fastening means, in particular welding pins, screws or rivets, wherein the fastening points are able to be moved in a latching manner between a plurality of positions relative to the aligning or fastening means used, in order to permit an adjustment of the vehicle trim part relative to the installed position on the vehicle. The latching takes place in this case by the shape of the through-holes which take the form of a series of overlapping round bores. At least one of the through-bores has in this case a portion with an enlarged diameter which permits the passage of the top part of an aligning means configured or pre-mounted on the vehicle.

This known method is not only complex and awkward but also represents a considerable cost with regard to the aligning means provided on the vehicle or specifically to be attached to the vehicle. In this known method, fine adjustments are also not possible.

The object of the invention, therefore, is to provide a method which permits a simple, rapid and reliable alignment of vehicle parts relative to one another, wherein, in particular, fine adjustments are intended to be able to be implemented without greater expense.

SUMMARY

According to the invention, this object is achieved in that the two components engage in one another via a ratchet toothing, in that the two components are able to be displaced relative to one another transversely to the ratchet teeth for the purpose of adjustment and in that, after the adjustment of the vehicle parts to be joined together, the two components are able to be fixedly and undisplaceably connected together. The ratchet toothing in this case may be selected to be as small as desired, wherein the spacings of the ratchet teeth are preferably on the order of 0.5 mm. Smaller step sizes may be implemented, for example, by offsetting the teeth relative to one another or introducing smaller teeth on one or both bearing surfaces.

In By means of the method according to the invention, very reliable pre-settings may be permitted in a very simple manner, as soon as the trim parts have been stabilized relative to one another. Due to the easy accessibility of the components according to the invention it is also still possible to undertake subsequent adjustments retrospectively.

Preferably, at least one of the two components consists of resiliently deformable plastics material, so that the ratchet toothing of the two components engaging in one another may be easily displaced by slight deformation of at least one of the two components, whilst at the same time the clamping forces provide sufficient retention in the ratchet and prevent a separation of the two ratchet halves by gravitational forces.

Expediently, one of the two components is able to be connected as a base part fixedly to the vehicle body, whilst the other component is fastened as an adjustment part to the vehicle part to be adjusted or is integrated in the vehicle part to be adjusted.

The base part preferably has a receiver channel, whilst the adjustment part is provided with a ratchet shoe which is able to be inserted into the receiver channel of the base part, wherein ratchet toothings which engage in one another are provided both in the receiver channel of the base part and on the ratchet shoe of the adjustment part.

The receiver channel of the base part expediently encloses the ratchet shoe of the adjustment part by more than 180° in an approximately positive manner so that the ratchet shoe is reliably guided in the receiver channel and may be displaced accurately and in small steps and even in the mounting phase permits a reliable retention of the ratchet shoe in the receiver channel.

The cross section of the receiver channel may be of rectangular configuration but also may have any other shape.

The receiver channel expediently has on its upper face a continuous longitudinal gap whilst the ratchet shoe of the adjustment part is provided at the corresponding point with at least one longitudinal rib, which protrudes from the longitudinal gap of the receiver channel when the ratchet shoe is inserted.

The ratchet toothing of the receiver channel is expediently arranged on the bottom surface opposing the longitudinal gap, so that the individual fine ratchet teeth have a sufficient width in order to ensure an effective retention between the receiver channel and the ratchet shoe.

A screw connection with a slot is preferably provided between the adjustment part and the base part so that, after the respective adjustment, the two components may be fastened relative to one another in different positions.

Preferably, the slot is configured in the adjustment part whilst the screw is able to be screwed into a bore of the base part through the slot of the adjustment part. As a result, a simple adjustment and a stable retention is possible between the base part and adjustment part.

BRIEF DESCRIPTION OF THE DRAWING FIGURES

The invention is shown by way of example in the drawings and described in detail with reference to the drawings, in which.

Figure 1:
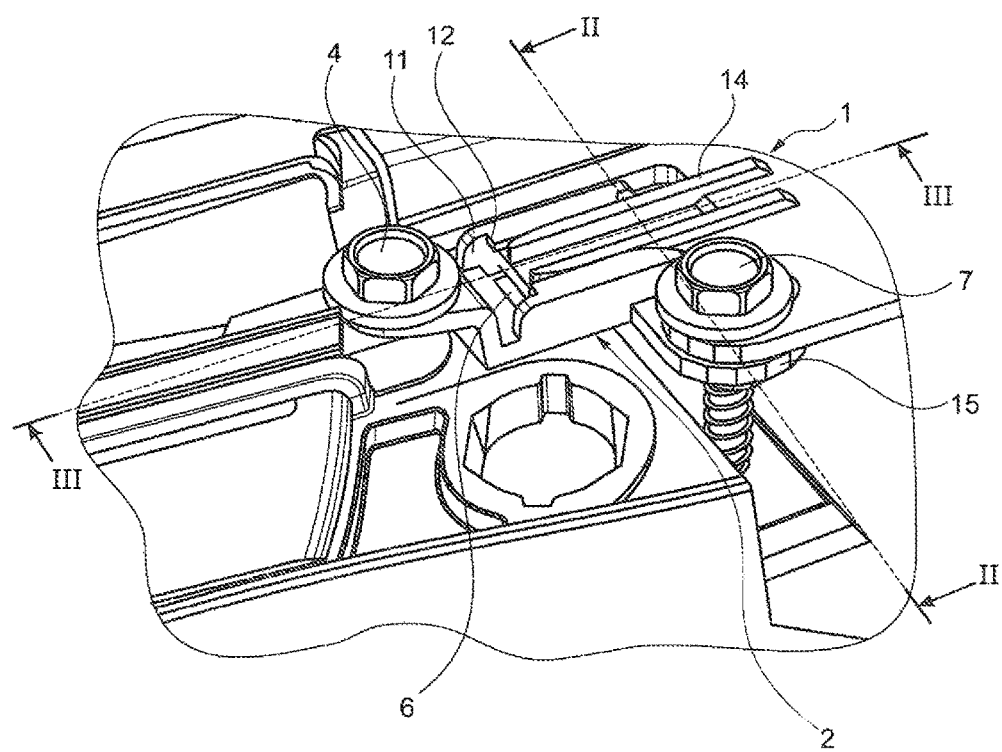
FIG. 1 shows a detail of a vehicle region below the engine hood.
Figure 3:
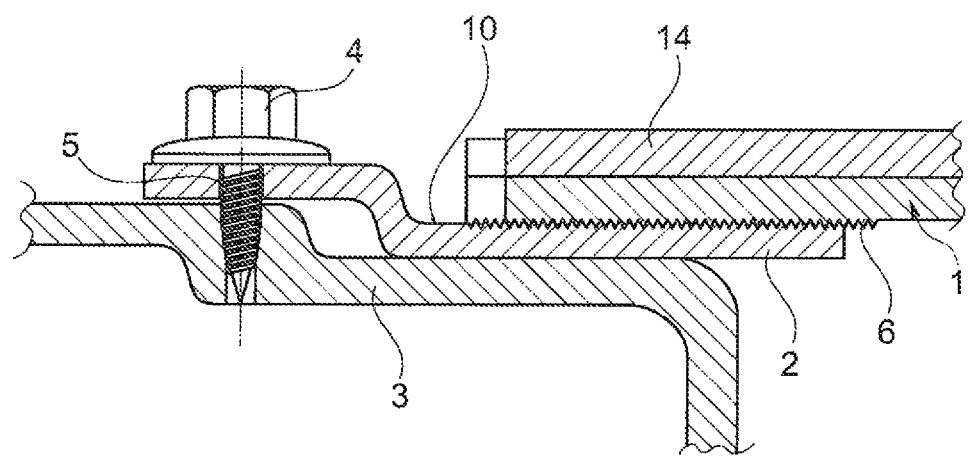
Figure 4:
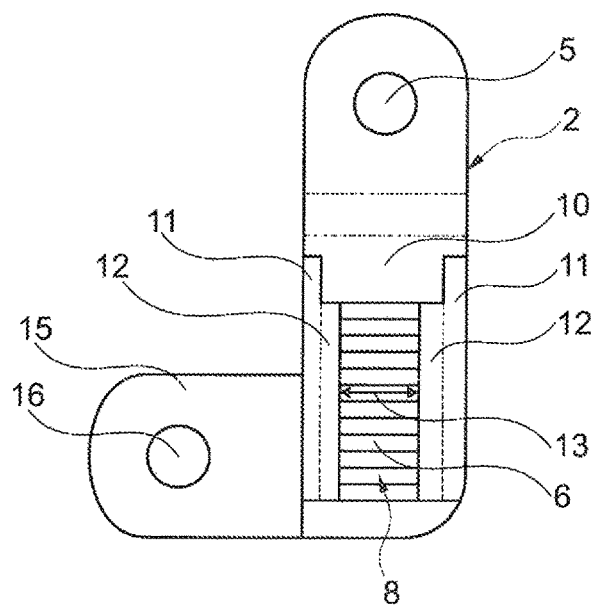

FIG. 3 a section along the line III-III of FIG. 1,

FIG. 4 shows a view of the base part as a plan view and

Figure 5:
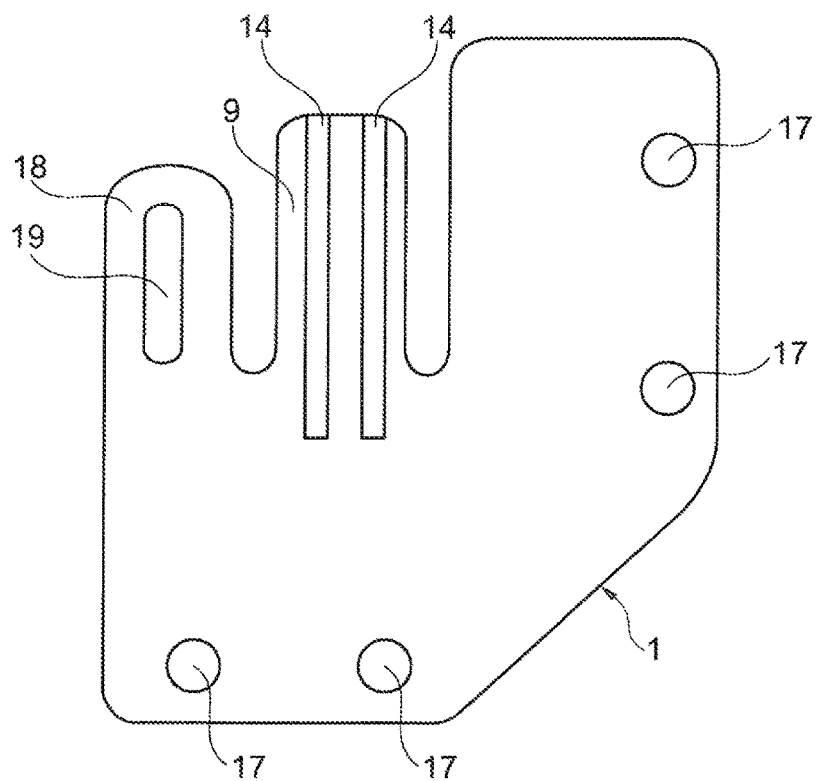

FIG. 5 shows a view of the adjustment part, also as a plan view.

DETAILED DESCRIPTION

In FIG. 1 of the drawings, the component group is shown. The component group is used to align the individual vehicle trim parts relative to one another, and then to adjust and fasten them to the vehicle body.

This component group consists of an adjustment part 1 which is fastened by means of screws, rivets or the like to the vehicle part to be adjusted, as well as a base part 2 which is fixedly connected to the vehicle body 3, wherein the adjustment part 1 is preferably integrated in the vehicle part to be adjusted. The connection between the base part 2 and the vehicle body 3 takes place in the exemplary embodiment shown in the drawings by means of a screw 4 which engages through a bore 5 provided in the base part 2 and is screwed into the vehicle body 3.

The adjustment part 1 and the base part 2, on the one hand, are displaceably connected together via a ratchet toothing 6 and, on the other hand, are able to be connected fixedly together via a screw 7 which engages both through the adjustment part 1 and through the base part 2.

The ratchet toothing 6 which is arranged between the adjustment part 1 and the base part 2 and permits a specific displacement of the two parts relative to one another is, on the one hand, configured in a receiver channel 8 of the base part 2 and, on the other hand, on a ratchet shoe 9 of the adjustment part 1.

The receiver channel 8 is formed by the top surface 10 of the base part 2, two side walls 11 extending vertically upward from the surface 10, arranged spaced apart from one another, as well as inwardly protruding claws 12 on the upper ends of the side walls 11. A continuous longitudinal gap 13 remains between the inner front ends of the claws 12, so that the receiver channel 8 is upwardly open in its central region.

The receiver channel 8, formed by the surface 10 of the base part 2, the two side walls 11 as well as the inwardly oriented claws 12, has a substantially rectangular cross section which serves for receiving the correspondingly configured ratchet shoe 9.

One half of the ratchet toothing 6 is arranged at the bottom of the receiver channel 8, which is formed by the surface 10 of the base part 2, wherein the teeth extend transversely to the longitudinal direction of the receiver channel 8.

The ratchet shoe 9 is adapted to the rectangular cross section of the receiver channel 8 and is provided on its side facing the surface 10 of the base part 2 with the second half of the ratchet toothing 6.

On the side opposing the ratchet toothing 6, the ratchet shoe 9 is provided with two longitudinal ribs 14 extending parallel in the longitudinal direction of the ratchet shoe 9, said longitudinal ribs protruding outwardly through the longitudinal gap 13 of the receiver channel 8 and, in particular, serving for reinforcing the ratchet shoe 9.

In FIG. 4, the base part 2 is shown in plan view, wherein the receiver channel 8 formed by the surface 10 of the base part 2, the side walls 11, as well as the inwardly protruding claws 12 may be clearly seen. The ratchet toothing 6 may be seen on the bottom of the receiver channel 8, wherein the individual ratchet teeth extend transversely through the receiver channel 8.

Figure 2:
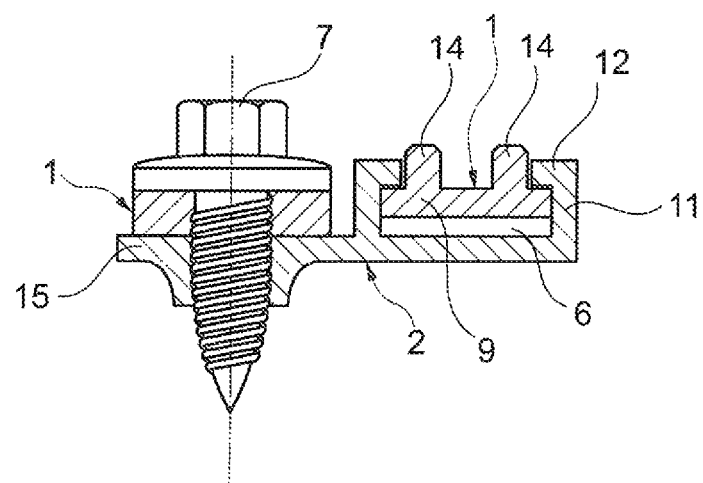
FIG. 2 shows a section along the line II-II of FIG. 1.

The bore 5 through which the screw 4 shown in FIG. 2 engages in order to fasten the base part 2 to the vehicle body 3 may be seen in the upper part in FIG. 4.

As may be further seen from FIG. 4, the elongated base part 2 is provided with a planar lateral tongue 15 in which a bore 16 is configured in order to connect the adjustment part 1 fixedly to the base part 2 by means of the screw 7.

In FIG. 5, a plan view is shown of the adjustment part 1. The adjustment part 1 is fastened to the vehicle trim part to be adjusted by means of screws, rivets or the like which engage through corresponding fastening bores 17. Instead of being fastened to the vehicle trim part, the adjustment part may be designed as an integral part of the vehicle trim part.

The ratchet shoe 9 may be seen approximately in the central region of the adjustment part 1, the height and width thereof being adapted to the dimensions of the receiver channel 8 configured in the base part 2. On its lower face, not visible in the drawings, the ratchet shoe 9 is provided with its corresponding ratchet toothing 6 which, if the ratchet shoe 9 is inserted into the receiver channel 8 of the base part 2, engages in the ratchet toothing 6 of the receiver channel.

The ratchet toothing 6 may be selected to be of any type. However, in order to achieve an accurate adjustment, the tooth spacings may be selected to be relatively small, so that tooth spacings of only ca. 0.5 mm are occasionally implemented.

Both the adjustment part 1 and the base part 2 consist of commercially available, easily resiliently deformable plastics material, so that by minimal widening of the receiver channel 8 with slight pressure in the receiver channel 8 the ratchet shoe 9 may be pushed back and forth, wherein the ratchet toothing 6 in each case springs from tooth to tooth. As a result, a specific retention between the adjustment part 1 and the base part 2 is produced so that even without the final fixing by means of the screw 7 a relatively fixed seat is produced which considerably simplifies the mounting.

A mounting tongue 18 provided on the adjustment part 1 and in which a slot 19 extending parallel to the longitudinal axis of the ratchet shoe 9 is formed may be seen in FIG. 5 on the left-hand side.

When inserting the ratchet shoe 9 in the receiver channel 8, the mounting tongue 18 is pushed over the lateral tongue 15 provided on the base part 2, so that the slot 19 may be brought into congruence with the bore 16.

Once the adjustment is finally completed, the screw 7 is screwed through the slot 19 into the bore 16 of the base part 2, so that the relative position between the adjustment part 1 and the base part 2 may be fixed.

If after mounting it becomes apparent that the adjustment is not yet optimal, the screw 7 may be slightly released and retrospective adjustment may be carried out until an optimal relative position of the vehicle parts to be adjusted relative to one another is achieved. Subsequently, the screw 7 is then tightened again, so that the adjustment part 1 is connected fixedly and undisplaceably to the base part 2.

In practice, the adjustment part 1 and the base part 2 are premounted by means of the screws 4 and 7. If the final adjustment is then to take place, the screw 7 which connects the adjustment part 1 to the base part 2 is released in order to be able to displace the parts relative to one another. If, for example, a fender is to be adjusted, the transition from the fender to the engine hood is pushed against a process spacer fastened to the closed engine hood, and after opening the engine hood, then the screw 7 may be tightened again in order to fix the adjusted state.

By the use of the ratchet toothing 6 and by the choice of an optimal tooth spacing, the best tolerances of the hood/fender gap may be permitted.

The component group according to the invention may be used anywhere when vehicle trim parts have to be aligned, adjusted and fastened relative to one another, during the assembly of vehicles.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A component group joining together vehicle trim parts which have to be aligned, adjusted and fastened relative to one another during assembly, said component group comprising at least two components including:
   a base part having a base portion including a bore extending therethrough and two sidewalls protruding therefrom forming a receiver channel, said receiver channel having a first ratchet toothing arranged on a bottom surface of the receiver channel and a longitudinal gap defined between the two sidewalls opposing the first ratchet toothing; and
   an adjustment part having a ratchet shoe inserted into the receiver channel of the base part and a mounting tongue having a slot extending parallel to a longitudinal axis of the ratchet shoe, said ratchet shoe having a second ratchet toothing arranged on a bottom surface thereof,
   whereby said at least two components are fastened to the vehicle trim parts to be connected together and are displaced relative to one another, characterized in that the at least two components engage in one another via the first and second ratchet toothings such that the receiver channel of the base part encloses the ratchet shoe of the adjustment part by more than 180° in an approximately positive manner, in that the at least two components are displaced relative to one another transversely to said first and second ratchet toothings for the purpose of adjustment and in that, after the adjustment of the vehicle trim parts to be joined together, the at least two components are fixedly and undisplaceably connected together via a screw screwed into the bore of the base part through the slot of the adjustment part.

2. The component group as claimed in claim 1, characterized in that at least one of the two components consists of resiliently deformable plastics material.

3. The component group as claimed in claim 2, characterized in that the base part is connected fixedly to a vehicle body and in that the adjustment part is fastened to the vehicle part to be adjusted.

4. The component group as claimed in claim 3, characterized in that one of the at least two components is configured as an integral component of the vehicle body or of the vehicle part to be adjusted.

5. The component group as claimed in claim 4, characterized in that the ratchet shoe is provided with at least one longitudinal rib which protrudes from the longitudinal gap of the receiver channel when the ratchet shoe is inserted.

6. The component group as claimed in claim 1, characterized in that the base part is connected fixedly to a vehicle body and in that the adjustment part is fastened to the vehicle part to be adjusted.

7. The component group as claimed in claim 1, characterized in that one of the at least two components is configured as an integral component of the vehicle body or of the vehicle part to be adjusted.

8. The component group as claimed in claim 7, characterized in that the ratchet shoe is provided with at least one longitudinal rib which protrudes from the longitudinal gap of the receiver channel when the ratchet shoe is inserted.

9. A component group joining together vehicle trim parts which have to be aligned, adjusted and fastened relative to one another during assembly, said component group comprising:
   a base part having a base portion including a bore extending therethrough and two sidewalls protruding therefrom forming a receiver channel, said receiver channel having a first ratchet toothing arranged on a bottom surface of the receiver channel and a longitudinal gap defined between the two sidewalls opposing the first ratchet toothing; and
   an adjustment part including a ratchet shoe and a mounting tongue having a slot extending parallel to a longitudinal axis of the ratchet shoe, said ratchet shoe having a second ratchet toothing arranged on a bottom surface thereof and two longitudinal ribs arranged on a too surface of the ratchet shoe extending parallel in a longitudinal direction of the ratchet shoe,
   whereby said base part and said adjustment part are fastened to the vehicle trim parts to be connected together and are displaced relative to one another, characterized in that said base part and said adjustment part engage in one another via the first and second ratchet toothings such that said two longitudinal ribs extend through said longitudinal gap of the receiver channel and in that said adjustment part and said base part are displaced relative to one another transversely to said first and second ratchet toothings for the purpose of adjustment and in that, after the adjustment of the vehicle trim parts to be joined together, said adjustment part and said base part are fixedly and undisplaceably connected together via a screw screwed into the bore of the base part through the slot of the adjustment part.

* * * * *

UNITED STATES PATENT AND TRADEMARK OFFICE
CERTIFICATE OF CORRECTION

PATENT NO.         : 10,099,631 B2
APPLICATION NO.    : 14/705117
DATED              : October 16, 2018
INVENTOR(S)        : Hubert Neissen et al.

Page 1 of 1

It is certified that error appears in the above-identified patent and that said Letters Patent is hereby corrected as shown below:

In the Claims

Column 6, Line 30, Claim 9, please replace "too" with ---top---.

Signed and Sealed this
Fourth Day of December, 2018

Andrei Iancu
*Director of the United States Patent and Trademark Office*